US012686407B2

(12) United States Patent
Watanabe et al.

(10) Patent No.: US 12,686,407 B2
(45) Date of Patent: Jul. 21, 2026

(54) CONTROLLING AUTONOMOUS VEHICLES BASED ON EDGE SERVERS' RESOURCES

(71) Applicant: International Business Machines Corporation, Armonk, NY (US)

(72) Inventors: Shoichiro Watanabe, Tokyo (JP); Kenichi Takasaki, Tokyo (JP); Mari Abe Fukuda, Tokyo (JP); Sanehiro Furuichi, Tokyo (JP); Tomonori Sugiura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 18/406,348

(22) Filed: Jan. 8, 2024

(65) Prior Publication Data

US 2025/0222954 A1 Jul. 10, 2025

(51) Int. Cl.
B60W 60/00 (2020.01)
B60W 30/12 (2020.01)
(Continued)

(52) U.S. Cl.
CPC ........ B60W 60/0015 (2020.02); B60W 30/12 (2013.01); H04L 67/101 (2013.01);
(Continued)

(58) Field of Classification Search
CPC ............. B60W 60/0015; B60W 30/12; B60W 2556/40; B60W 2556/45; H04L 67/101; H04L 67/1021
See application file for complete search history.

(56) References Cited

U.S. PATENT DOCUMENTS 11,269,356 B2 3/2022 Rakshi et al.
2020/0136978 A1* 4/2020 Li ......................... H04L 67/141
(Continued)

FOREIGN PATENT DOCUMENTS

CN 113326126 A 8/2021
CN 115996429 A 4/2023
(Continued)

OTHER PUBLICATIONS

"10 examples of smart city solutions", by State of Green, Nov. 1, 2018, 22 pages, https://stateofgreen.com/en/news/10-examples-of-smart-city-solutions/.
(Continued)

*Primary Examiner* — Toya Pettiegrew
(74) *Attorney, Agent, or Firm* — Michael O'Keefe

(57) ABSTRACT

A computer-implemented method, system, and computer program product for reducing loads of edge servers in an autonomous mobility environment. The load of an edge server, which controls autonomous vehicles located within the edge server's coverage area, is estimated. In response to the estimated load of the edge server exceeding a threshold value, an action to reduce the load of the edge server is implemented by controlling one or more of the autonomous vehicles to operate in a certain manner so as to reduce the load of the edge server. Examples of controlling the autonomous vehicles to operate in a certain manner so as to reduce the load of the edge server include modifying a movement of the autonomous vehicle, modifying a frequency of sending vehicle data, offloading calculations to be performed in the autonomous vehicle that were previously being performed in the edge server, restricting lane changes, etc.

20 Claims, 7 Drawing Sheets

600

(51) Int. Cl.
    *H04L 67/101*        (2022.01)
    *H04L 67/1021*      (2022.01)
(52) U.S. Cl.
    CPC ..... *H04L 67/1021* (2013.01); *B60W 2556/40*
              (2020.02); *B60W 2556/45* (2020.02)

(56)              References Cited

U.S. PATENT DOCUMENTS

| | | | |
|---|---|---|---|
| 2020/0310413 A1* | 10/2020 | Zhao | H04L 67/12 |
| 2021/0192867 A1* | 6/2021 | Fang | G07C 5/0816 |
| 2022/0083391 A1 | 3/2022 | Liu et al. | |
| 2023/0060164 A1 | 3/2023 | Wang et al. | |
| 2024/0326866 A1* | 10/2024 | Hirano | G08G 1/096725 |

FOREIGN PATENT DOCUMENTS

| | | |
|---|---|---|
| CN | 117149351 A | 12/2023 |
| KR | 2023-0032383 A | 3/2023 |
| WO | 2025/149814 A1 | 7/2025 |

OTHER PUBLICATIONS

"Platooning could be an answer for some long-haul problems in the mining industry", Mining Journal, Oct. 4, 2021, 10 pages, https://www.mining-journal.com/partners/partner-content/4069146/platooning-answer-long-haul-mining-industry.

DEIM Forum 2022 B41-3, 2022, 06 pages, https://proceedings-of-deim.github.io/DEIM2022/papers/B41-3.pdf.

International Searching Authority, "Notification of Transmittal of the International Search Report and the Written Opinion of the International Searching Authority, or Declaration," Patent Cooperation Treaty May 27, 2025, 03 pages, International Application No.-PCT/ IB2024/062738.

Komatsu, "First Successful Joint Experiment with NTT DoCoMo Demonstration Experiment of Remote Control of Large-Scale ICT Bulldozer for Mines Using Commercial 5G-Exhibited at" docomo Open House 2021, Feb. 2, 2021, 02 pages, https://www.komatsu.jp/ja/newsroom/2021/20210202.

Smart City Takesiba (R3-4), Marine-Gateway Minato, Jun. 16, 2022, 04 pages, https://www.mlit.go.jp/toshi/tosiko/content/001579884.pdfhttps://www.mlit.go.jp/toshi/tosiko/content/001579884.pdf.

Kubota et al., "Dynamic Resource Controller Technology to Accelerate Processing and Utilization of IoT Data," Fujitsui, vol. 67, No. 2, 2016, pp. 42-51.

Meneguette et al., "Vehicular Edge Computing: Architecture, Resource Management, Security, and Challenges," ACM Computing Surveys, vol. 55, No. 1, Article 4, Nov. 2021, pp. 1-46.

Furusawa et al., "Implementation and Evaluation of Latency-Based Dynamic Edge Offloading of Containerized Applications for Connected Cars," Information Processing Society of Japan Journal Digital Practice, vol. 3, No. 3, Jul. 2022, pp. 32-43.

Anonymously, "Method and System for Vehicle Route Assignment on Smart Roads Based on Aggregated Edge Resource Availability," IP.com, IP.com No. IPCOM000270102D, Jun. 3, 2022, pp. 1-3.

Dang et al., "Dynamic Offloading Method for Mobile Edge Computing of Internet of Vehicles Based on Multi-Vehicle Users and Multi-MEC Servers," Electronics, vol. 11, No. 2326, 2022, pp. 1-19.

* cited by examiner

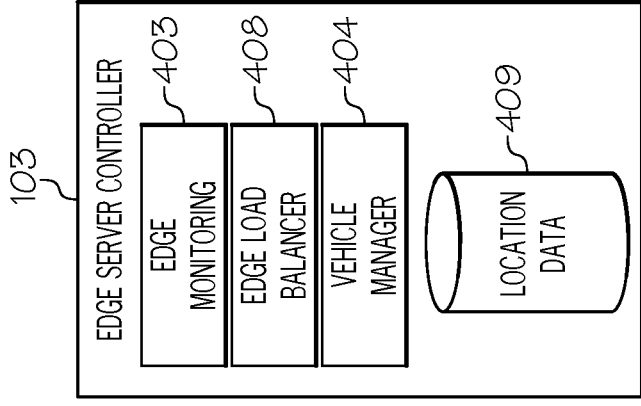
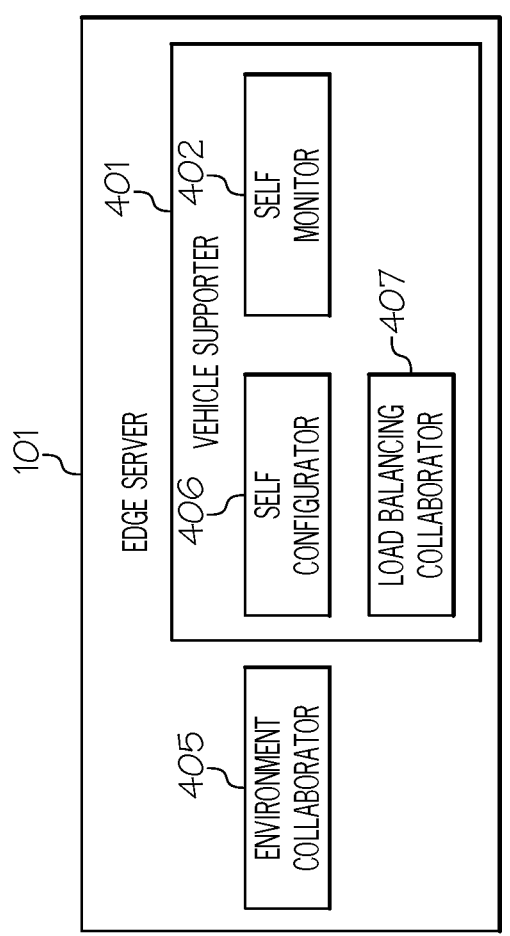
FIG. 4

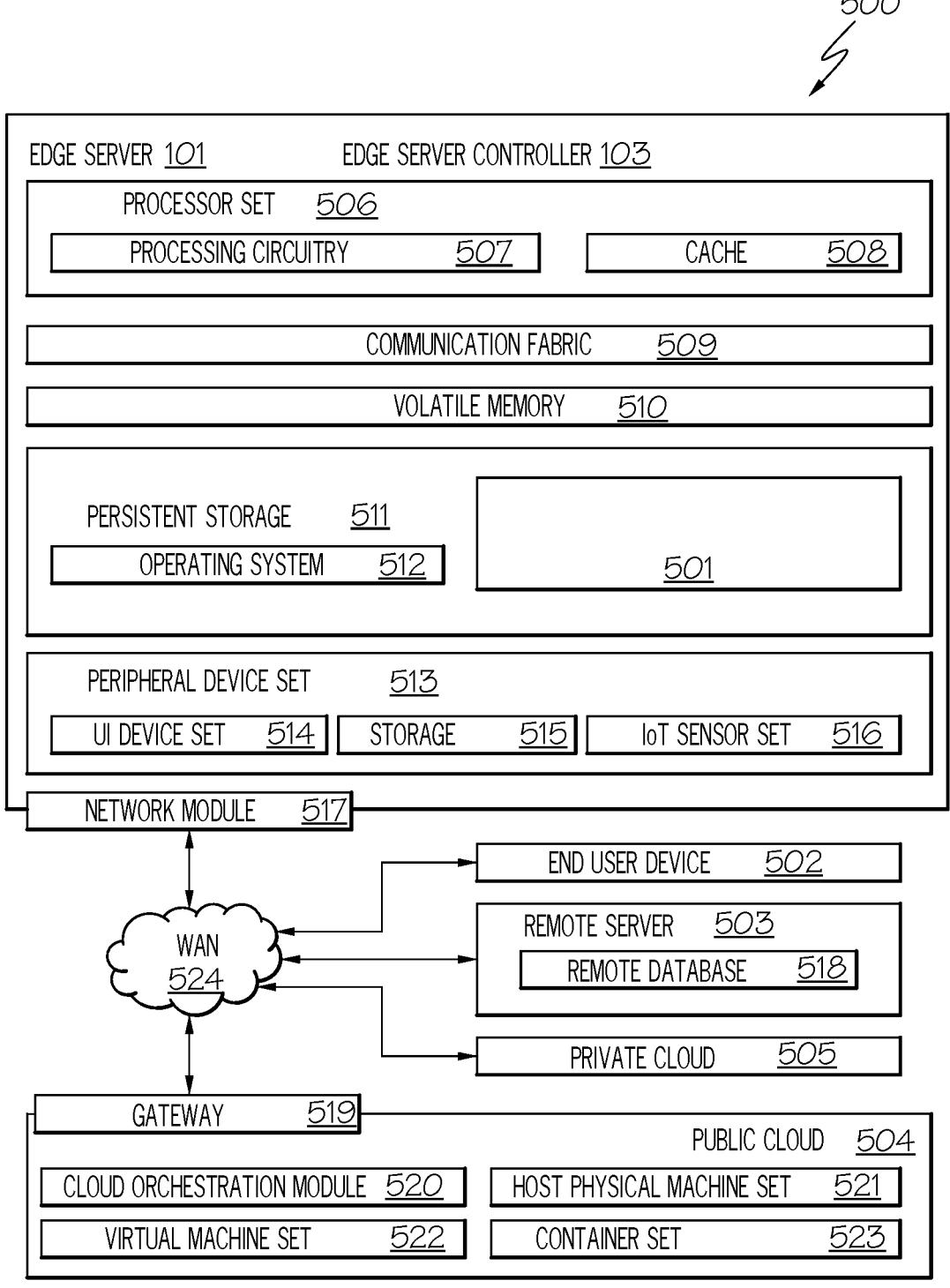

500

EDGE SERVER 101          EDGE SERVER CONTROLLER 103

PROCESSOR SET          506

PROCESSING CIRCUITRY          507          CACHE          508

COMMUNICATION FABRIC          509

VOLATILE MEMORY          510

PERSISTENT STORAGE          511

OPERATING SYSTEM          512

501

PERIPHERAL DEVICE SET          513

UI DEVICE SET          514          STORAGE          515          IoT SENSOR SET          516

NETWORK MODULE          517

END USER DEVICE          502

WAN
524

REMOTE SERVER          503

REMOTE DATABASE          518

PRIVATE CLOUD          505

GATEWAY          519

PUBLIC CLOUD          504

CLOUD ORCHESTRATION MODULE          520          HOST PHYSICAL MACHINE SET          521

VIRTUAL MACHINE SET          522          CONTAINER SET          523

FIG. 5

600
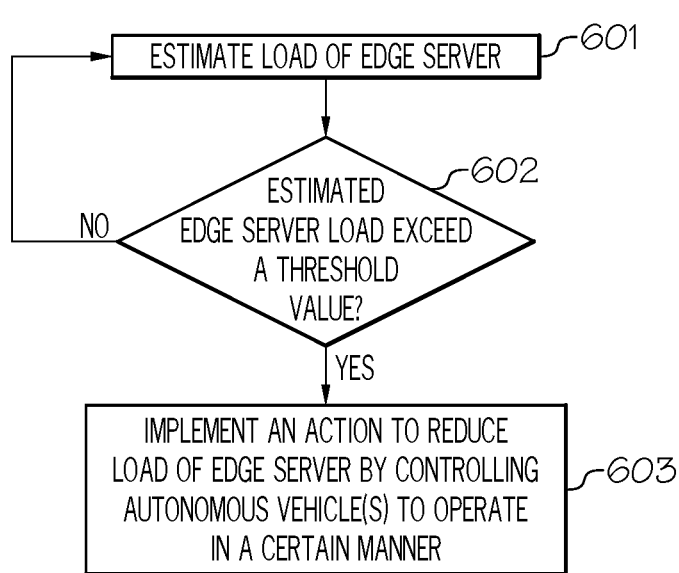
ESTIMATE LOAD OF EDGE SERVER —601
ESTIMATED
EDGE SERVER LOAD EXCEED
A THRESHOLD
VALUE? —602
NO
YES
IMPLEMENT AN ACTION TO REDUCE
LOAD OF EDGE SERVER BY CONTROLLING
AUTONOMOUS VEHICLE(S) TO OPERATE
IN A CERTAIN MANNER —603
FIG. 6

CONTROLLING AUTONOMOUS VEHICLES BASED ON EDGE SERVERS' RESOURCES

TECHNICAL FIELD

The present disclosure relates generally to autonomous mobility, and more particularly to controlling autonomous vehicles based on edge servers' resources.

BACKGROUND

Autonomous mobility refers to the movement of autonomous vehicles without human intervention. An autonomous vehicle refers to a vehicle (e.g., automobile, drone, farm equipment, mining equipment, etc.) capable of sensing its environment and operating without human involvement.

SUMMARY

In one embodiment of the present disclosure, a computer-implemented method for reducing loads of edge servers in an autonomous mobility environment comprises estimating a load of an edge server controlling autonomous vehicles. The method further comprises implementing an action to reduce the load of the edge server by controlling one or more of the autonomous vehicles to operate in a certain manner in response to the estimated load of the edge server exceeding a threshold value.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 4 illustrates the internal components of the edge server and the edge server controller used for controlling autonomous vehicles based on the edge servers' resources in accordance with an embodiment of the present disclosure;

FIG. 5 illustrates an embodiment of the hardware configuration of the edge server and the edge server controller which is representative of a hardware environment for practicing the present disclosure;

FIG. 6 is a flowchart of a method for handling transactions at peak times with the limited resources of the edge servers by controlling autonomous vehicles based on the edge servers' resources in accordance with an embodiment of the present disclosure.

DETAILED DESCRIPTION

Figure 1:
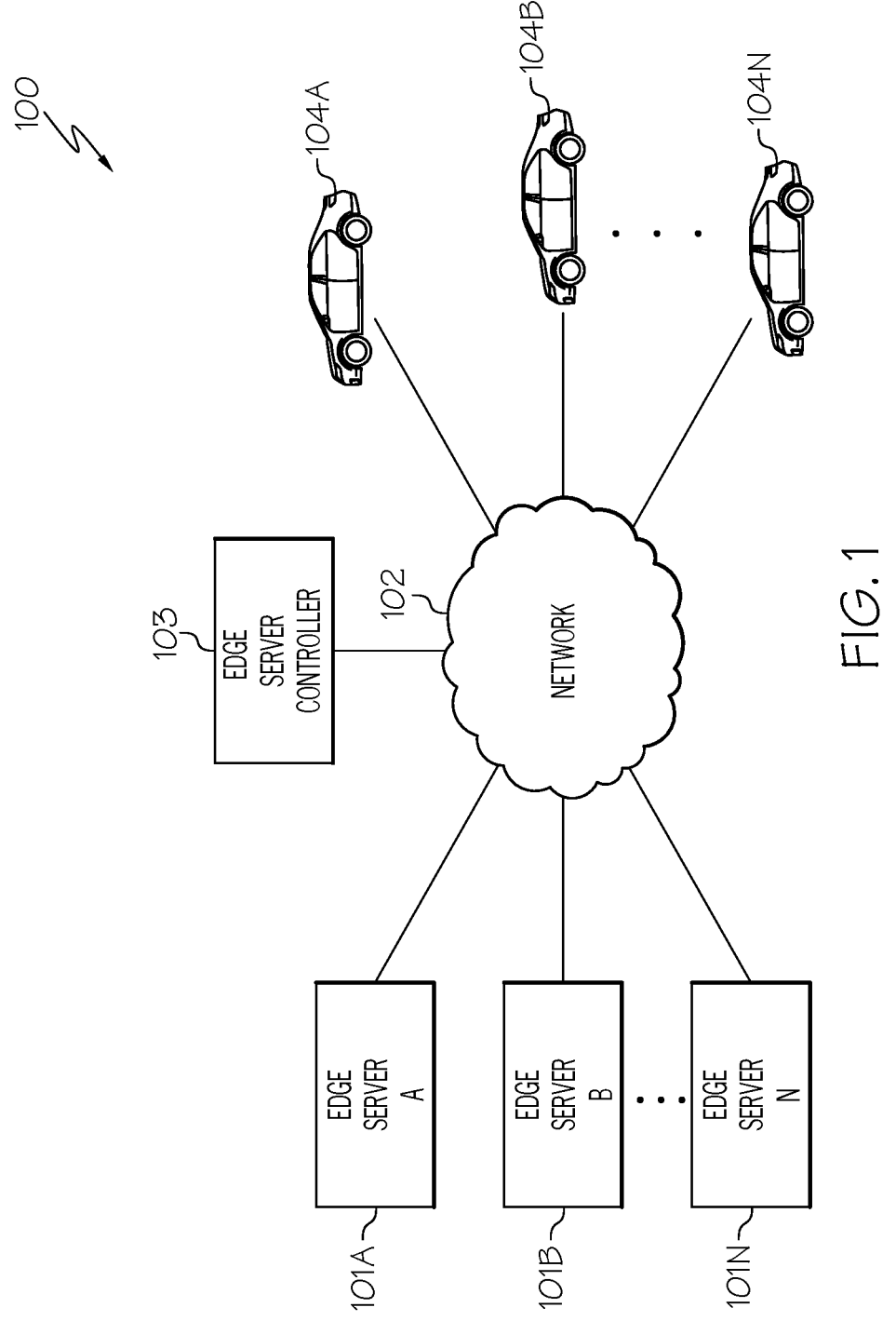
FIG. 1 illustrates an infrastructure for practicing the principles of the present disclosure in accordance with an embodiment of the present disclosure.

As stated above, autonomous mobility refers to the movement of autonomous vehicles without human intervention. An autonomous vehicle refers to a vehicle (e.g., automobile, drone, farm equipment, mining equipment, etc.) capable of sensing its environment and operating without human involvement.

Autonomous vehicles have the ability to continuously monitor their surroundings using an array of sensors, including cameras, radars, and lidars. These sensors provide a 360-degree view of the vehicle's environment, allowing it to detect any potential obstacles, pedestrians, or other vehicles with great precision. The advanced algorithms interpreting this data can make split-second decisions to avoid collisions and navigate safely through complex situations.

Autonomous mobility involving the movement of such autonomous vehicles may be implemented using edge computing. Edge computing refers to the architecture of a distributed computing paradigm that brings computation and data storage closer to the sources of data. Edge computing may be implemented using edge servers, which correspond to servers that are located close to the end user at the edge of the network.

Such edge servers may be utilized for handling various transactions, such as controlling autonomous vehicles in connection with handling traffic congestion, optimizing the routes of the autonomous vehicles, adjusting the speeds of the autonomous vehicles, merging autonomous vehicles efficiently, etc. Such controlling of autonomous vehicles requires extensive computational resources.

As a result, at times, the load of the edge server (the amount of work the edge server is handling at a given time) may be extensive, including causing the edge server to experience a peak load (highest amount of work the edge server is capable of handling at a given time). The time at which the edge server experiences a peak load is referred to as the "peak time."

In order to address such situations in which the edge server may be limited in handling transactions, such as during the peak times, transactions may be offloaded to adjacent edge servers or to cloud servers temporarily. However, the latency and accuracy of the computational analysis being performed by the edge servers is reduced.

Another alternative to addressing the situation when the edge server experiences peak load during peak times is to deploy extra edge servers. Unfortunately, such a solution requires additional costs, which can be very extensive.

Consequently, there is not currently a means for handling transactions, such as transactions involving autonomous vehicles, at peak times with the limited computational resources of the edge servers.

The embodiments of the present disclosure provide a means for handling transactions at peak times with the limited computational resources of the edge servers by reducing the peak load of edge servers collaborating among multiple autonomous vehicles and multiple edge servers by controlling autonomous vehicles based on the edge servers' resources. In one embodiment, the load of an edge server controlling autonomous vehicles, such as over an area managed by the edge server, is estimated. The "load," as used herein, refers to the amount of work the edge server is handling at a given time. The "edge server," as used herein, refers to a server located close to the end user at the edge of the network. An "autonomous vehicle," as used herein, refers to a vehicle (e.g., automobile, drone, farm equipment, mining equipment) capable of sensing its environment and operating without human involvement. Upon estimating the load of the edge server, an action to reduce the load of the edge server may be implemented by controlling one or more of the autonomous vehicles over the area managed by the edge server to operate in a certain manner so as to reduce the load of the edge server. For example, a load reduction plan associated with an autonomous vehicle may be implemented. A "load reduction plan," as used herein, refers to a strategy for reducing the load of the edge server by controlling the autonomous vehicle in a certain manner, such as modifying the route of the autonomous vehicle, modifying a movement of the autonomous vehicle, modifying a frequency of sending vehicle data, offloading calculations to be performed in the autonomous vehicle that were previously being performed in the edge server, joining the autonomous vehicle in a fleet of other autonomous vehicles, etc. In another example, the driving of the autonomous vehicle may be restricted or prohibited (e.g., restricted from lane changes thereby reducing driving behavior analysis) in a manner that reduces the load on the edge server. In another example, the autonomous vehicle is instructed to be rerouted to an area under control of a neighboring edge server so that the edge server with the peak load is not to be used. A further discussion regarding these and other features is provided below.

While the following mainly discusses the present disclosure in connection with controlling autonomous vehicles corresponding to automobiles based on the edge servers' resources, the principles of the present disclosure may also apply to controlling other types of autonomous vehicles, such as drones, farm equipment, mining equipment, etc. A person of ordinary skill in the art would be capable of applying the principles of the present disclosure to such implementations. Furthermore, embodiments applying the principles of the present disclosure to such implementations would fall within the scope of the present disclosure.

In some embodiments of the present disclosure, the present disclosure comprises a computer-implemented method, system, and computer program product for reducing loads of edge servers in an autonomous mobility environment. In one embodiment of the present disclosure, the load of an edge server, which controls autonomous vehicles located within the edge server's coverage area, is estimated. In one embodiment, the estimated load of the edge server corresponds to an estimated load that the edge server will handle in the near future. In one embodiment, the estimated load is based on the current edge server load, the estimated load of the neighboring edge servers, the number of incoming/outgoing autonomous vehicles in the coverage area of the edge server, and context information (information that a human driver usually takes into account while driving and adapting his/her driving, such as weather, road conditions, other vehicles, pedestrians, street signs, etc.). In response to the estimated load of the edge server exceeding a threshold value, an action to reduce the load of the edge server is implemented by controlling one or more of the autonomous vehicles to operate in a certain manner so as to reduce the load of the edge server. Examples of controlling the autonomous vehicles to operate in a certain manner so as to reduce the load of the edge server include modifying a movement of the autonomous vehicle, modifying a frequency of sending vehicle data, offloading calculations to be performed in the autonomous vehicle that were previously being performed in the edge server, joining the autonomous vehicle in a fleet of other autonomous vehicles, restricting lane changes, rerouting an autonomous vehicle to an area under control of a neighboring edge server so that the edge server with the peak load is not to be used, etc. In this manner, the peak load of edge servers collaborating among multiple autonomous vehicles and multiple edge servers is reduced by controlling autonomous vehicles based on the edge servers' resources.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of an infrastructure 100 for practicing the principles of the present disclosure. Infrastructure 100 includes edge servers 101A-101N (identified as "Edge Server A," "Edge Server B," and "Edge Server N," respectively, in FIG. 1), where N is a positive integer number, connected to an edge server controller 103 via a network 102. Edge servers 101A-101N may collectively or individually be referred to as edge servers 101 or edge server 101, respectively. An edge server 101, as used herein, refers to a server located close to the end user at the edge of the network.

Furthermore, as illustrated in FIG. 1, infrastructure 100 includes autonomous vehicles 104A-104N, where N is a positive integer number, connected to network 102. Autonomous vehicles 104A-104N may collectively or individually be referred to as autonomous vehicles 104 or autonomous vehicle 104, respectively. An autonomous vehicle 104, as used herein, refers to a vehicle (e.g., automobile, drone, farm equipment, mining equipment) capable of sensing its environment and operating without human involvement.

In one embodiment, autonomous vehicle 104 is configured with a set of computing resources. In one embodiment, autonomous vehicles 104 are configured to perform one or more transportation operations throughout various locations.

A description of the internal components of autonomous vehicles 104 is provided below in connection with FIG. 3.

Figure 2:
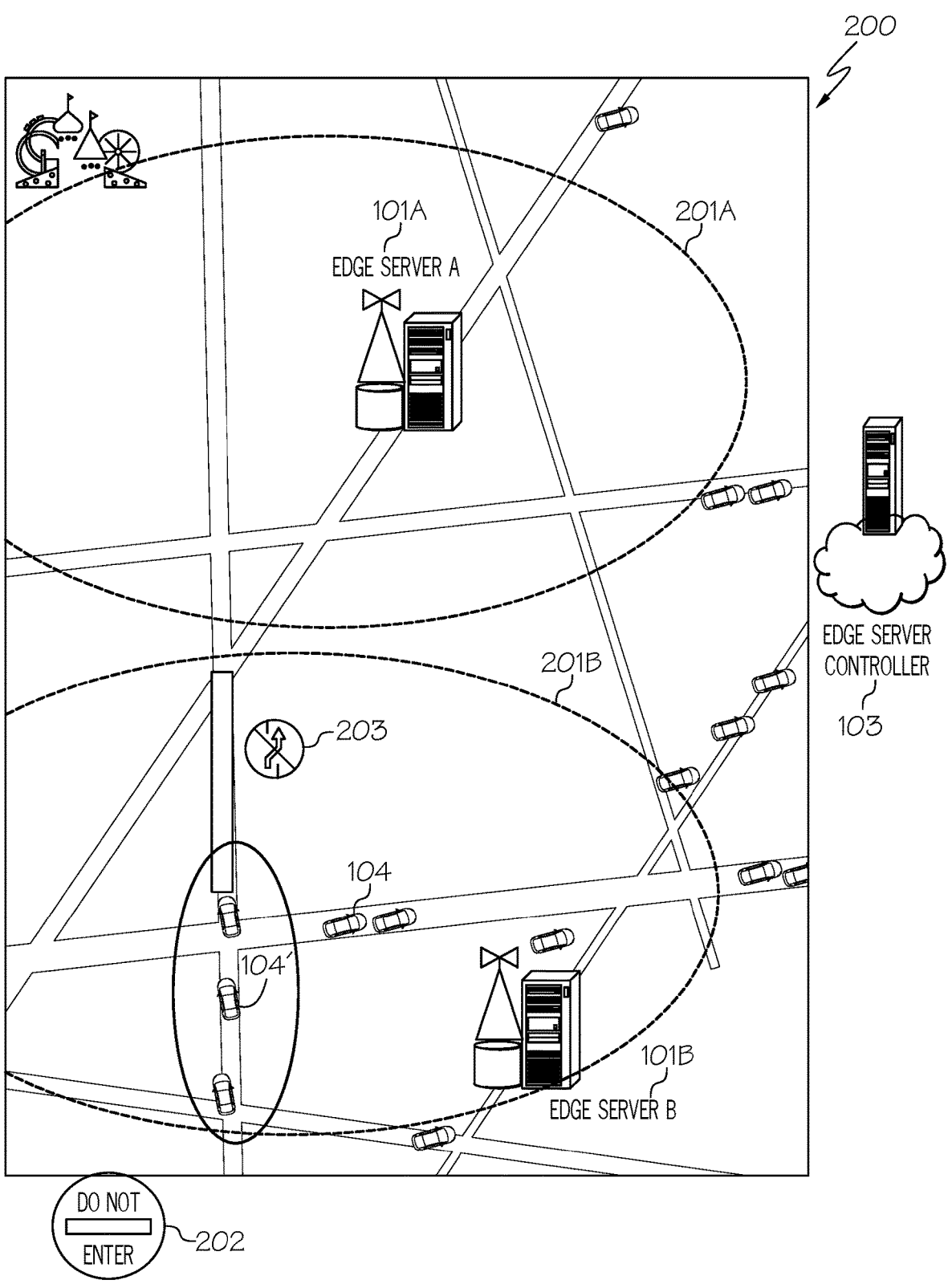
FIG. 2 is a map that dynamically illustrates the current location of autonomous vehicles in connection with the coverage areas of the edge servers in accordance with an embodiment of the present disclosure.

In one embodiment, each edge server 101 is configured to control one or more autonomous vehicles 104 residing within an area ("coverage area") covered by edge server 101 (e.g., edge server 101A). The "coverage area," as used herein, refers to the geographic region or location where the edge server 101 in question is responsible for controlling autonomous vehicles 104 residing within such a geographic region or location as illustrated in FIG. 2. Examples of edge servers 101 include, but are not limited to, Dell® PowerEdge® servers, NXP® EdgeVerse® platform, etc. In one embodiment, edge servers 101 correspond to MEC (multi-access edge computing) edge servers.

Referring to FIG. 2, FIG. 2 is a map 200 that dynamically illustrates the current location of autonomous vehicles (e.g., autonomous vehicles 104) in connection with the coverage areas of the edge servers (e.g., edge servers 101) in accordance with an embodiment of the present disclosure.

As shown in FIG. 2, map 200 illustrates that edge servers 101A, 101B are responsible for controlling autonomous vehicles 104 residing within coverage areas 201A, 201B, respectively. Coverage areas 201A-201B may collectively or individually be referred to as coverage areas 201 or coverage area 201, respectively.

As illustrated in FIG. 2, there are currently no autonomous vehicles 104 within coverage area 201A for edge server 101A to control. However, there are multiple autonomous vehicles 104 within coverage area 201B for edge server 101B to control.

Returning to FIG. 1, in conjunction with FIG. 2, in one embodiment, one or more edge servers 101 are located in road side units (RSUs), which are wireless communicating devices located on the roadside that provide connectivity and information support to passing autonomous vehicles 104, including safety warnings and traffic information. An example of such a road side unit includes the CIT-N1862 Brilliant road side unit by NXP® Semiconductors.

Furthermore, in one embodiment, edge server 101 in combination with edge server controller 103 is configured to control autonomous vehicles 104 within its coverage area 201 based on its available resources. In one embodiment, edge server 101 is configured to estimate a load of edge server 101. The "load," as used herein, refers to the amount of work the edge server is handling at a given time.

Upon estimating the load of edge server 101, an action to reduce the load of edge server 101 may be implemented by edge server 101, including in combination with edge server controller 103, such as by controlling autonomous vehicles 104 (e.g., autonomous vehicles 104 located within the coverage area managed by edge server 101) to operate in a certain manner so as to reduce the load of edge server 101. For example, a load reduction plan associated with an autonomous vehicle 104 may be implemented. A "load reduction plan," as used herein, refers to a strategy for reducing the load of the edge server by controlling the autonomous vehicle in a certain manner, such as by modifying the route of an autonomous vehicle, modifying a movement of the autonomous vehicle, modifying a frequency of sending vehicle data, offloading calculations to be performed in the autonomous vehicle that were previously being performed in the edge server, joining the autonomous vehicle in a fleet of other autonomous vehicles, etc. In another example, the driving of autonomous vehicle 104, such as an autonomous vehicle 104 located within coverage area 201 of edge server 101, may be restricted or prohibited (e.g., restricted from lane changes thereby reducing driving behavior analysis) in a manner that reduces the load on edge server 101. In another example, autonomous vehicle 104 located within the coverage area of edge server 101 is instructed to be rerouted to an area under the control of a neighboring edge server 101 so that edge server 101 with a peak load is not to be used. A "neighboring edge server," as used herein, refers to an edge server (e.g., edge server 101B) located within a close proximity to the edge server in question (e.g., edge server 101A), such as an edge server 101 (e.g., edge server 101B) that has a coverage area (e.g., coverage area 201B) that is adjacent to the coverage area (e.g., coverage area 201A) of the edge server in question (e.g., edge server 101A).

A description of the internal components of edge server 101 utilized for performing such functions is provided further below in connection with FIG. 4. A description of the hardware configuration of edge server 101 is provided further below in connection with FIG. 5.

In one embodiment, edge server controller 103 is configured to monitor edge servers 101 for incoming messages from edge servers 101. Furthermore, in one embodiment, edge server controller 103 is configured to implement load balancing, which is the process of distributing a set of tasks over the resources (edge servers 101), with the aim of making their overall processing more efficient. Additionally, in one embodiment, edge server controller 103 is configured to manage autonomous vehicles 104, such as grouping or joining an autonomous vehicle 104 to a fleet of other autonomous vehicles 104 or rerouting an autonomous vehicle 104 to travel in a different coverage area 201 controlled by a different edge server 101. Furthermore, in one embodiment, edge server controller 103 is configured to store location data, such as the locations of edge servers 101 and autonomous vehicles 104. In one embodiment, edge server controller 103 resides within the cloud (distributed collection of servers that host software and infrastructure). A description of the internal components of edge server controller 103 utilized for performing such functions is provided further below in connection with FIG. 4. A description of the hardware configuration of edge server controller 103 is provided further below in connection with FIG. 5.

Network 102 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with infrastructure 100 of FIG. 1 without departing from the scope of the present disclosure.

Infrastructure 100 is not to be limited in scope to any one particular network architecture. Infrastructure 100 may include any number of edge servers 101, networks 102, edge server controllers 103, and autonomous vehicles 104.

Figure 3:
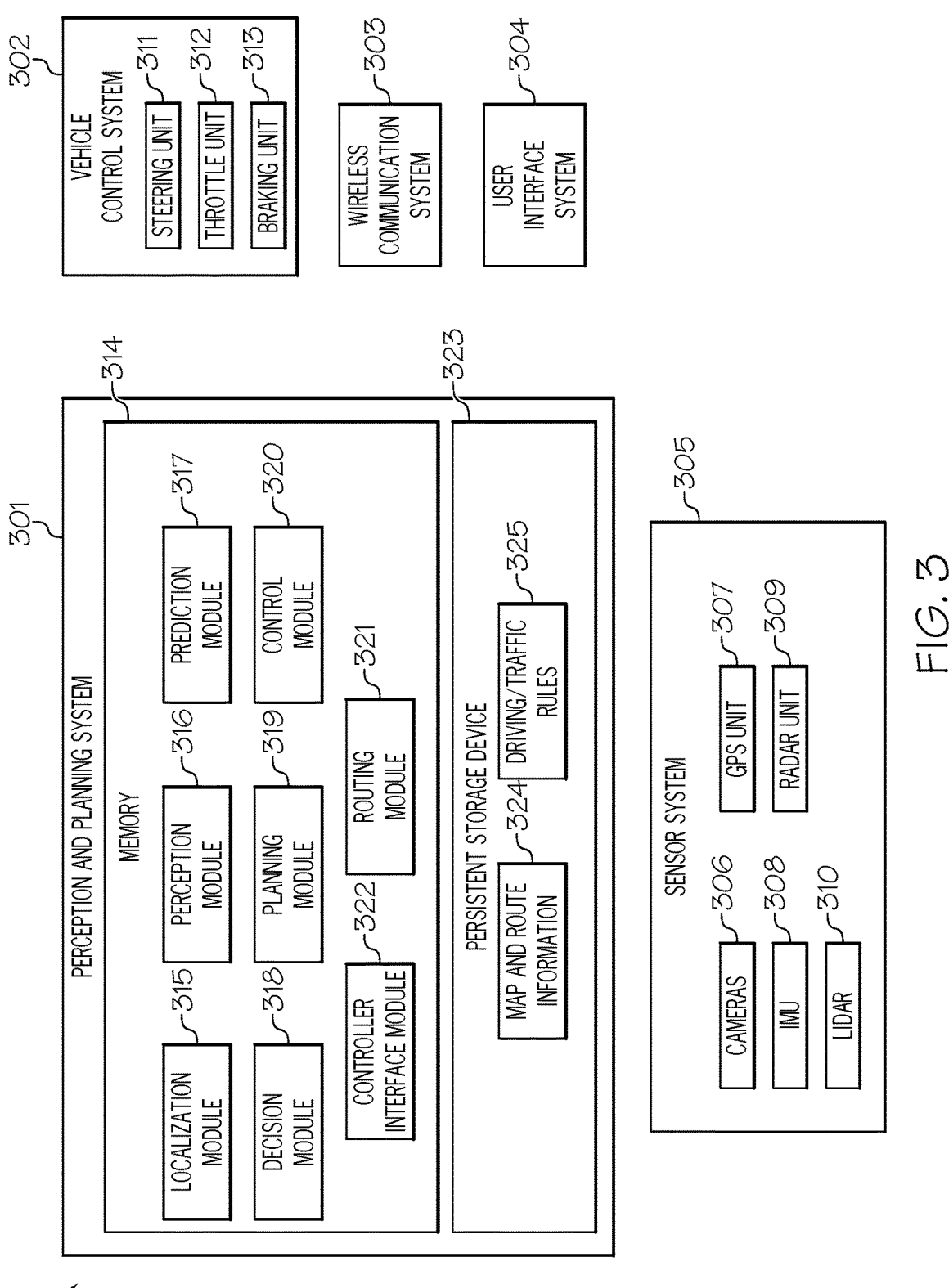
FIG. 3 illustrates the internal components of the autonomous vehicles in accordance with an embodiment of the present disclosure.

Referring now to FIG. 3, FIG. 3 illustrates the internal components of autonomous vehicles 104 (FIG. 1) in accordance with an embodiment of the present disclosure.

As shown in FIG. 3, in conjunction with FIG. 1, autonomous vehicle 104 includes, but is not limited to, perception and planning system 301, vehicle control system 302, wireless communication system 303, user interface system 304, and sensor system 305. Autonomous vehicle 104 may further include certain common components included in ordinary vehicles, such as, an engine, wheels, steering wheel, transmission, etc., which may be controlled by vehicle control system 302 and/or perception and planning system 301 using a variety of communication signals and/or commands, such as, for example, acceleration signals or commands, deceleration signals or commands, steering signals or commands, braking signals or commands, etc.

Components 301-305 may be communicatively coupled to each other via an interconnect, a bus, a network, or a combination thereof. For example, components 301-305 may be communicatively coupled to each other via a controller area network (CAN) bus. A CAN bus is a vehicle bus standard designed to allow microcontrollers and devices to communicate with each other in applications without a host computer.

In one embodiment, sensor system 305 includes, but it is not limited to, one or more cameras 306, global positioning system (GPS) unit 307, inertial measurement unit (IMU) 308, radar unit 309, and a light detection and range (LiDAR) unit 310. GPS unit 307 may include a transceiver operable to provide information regarding the position of autonomous vehicle 104. IMU 308 may sense position and orientation changes of autonomous vehicle 104 based on inertial acceleration. Radar unit 309 may represent a system that utilizes radio signals to sense objects within the local environment of autonomous vehicle 104. In one embodiment, in addition to sensing objects, radar unit 309 may additionally sense the speed and/or heading of the objects. LiDAR unit 310 may sense objects in the environment in which autonomous vehicle 104 is located using lasers. LiDAR unit 310 could include one or more laser sources, a laser scanner, and one or more detectors, among other system components. Cameras 306 may include one or more devices to capture images of the environment surrounding autonomous vehicle 104. Cameras 306 may be still cameras and/or video cameras. A camera may be mechanically movable, for example, by mounting the camera on a rotating and/or tilting a platform.

Sensor system 305 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 302 includes, but are not limited to, steering unit 311, throttle unit 312 (also referred to as an acceleration unit), and braking unit 313. Steering unit 311 is to adjust the direction or heading of the vehicle. Throttle unit 312 is to control the speed of the motor or engine that in turn controls the speed and acceleration of the vehicle. Braking unit 313 is to decelerate the vehicle by providing friction to slow the wheels or tires of the vehicle.

Furthermore, in one embodiment, wireless communication system 303 is to allow communication between autonomous vehicle 104 and external systems, such as edge server 101, edge server controller 103. For example, wireless communication system 303 can wirelessly communicate with one or more devices directly or via a communication network, such as edge server 101 over network 102. Wireless communication system 303 can use any cellular communication network or a wireless local area network (WLAN) (e.g., using WiFi to communicate with another component or system). Wireless communication system 303 could communicate directly with a device (e.g., a speaker within autonomous vehicle 104), for example, using an infrared link, Bluetooth, etc.

In one embodiment, user interface system 304 is part of the peripheral devices implemented within autonomous vehicle 104 including, for example, a keyboard, a touch screen display device, a microphone, a speaker, etc.

Some or all of the functions of autonomous vehicle 104 may be controlled or managed by perception and planning system 301, especially when operating in an autonomous driving mode. Perception and planning system 301 includes the necessary hardware (e.g., processor(s), memory, storage) and software (e.g., operating system, planning and routing programs) to receive information from sensor system 305, vehicle control system 302, wireless communication system 303, and/or user interface system 304, process the received information, plan a route or path from a starting point to a destination point, and then drive autonomous vehicle 104 based on the planning and control information. Alternatively, perception and planning system 301 may be integrated with vehicle control system 302.

For example, edge server 101 and/or edge server controller 103 specifies a starting location and a destination of a trip (e.g., parking spot), for example, via a user interface. Perception and planning system 301 obtains the trip related data. For example, perception and planning system 301 may obtain location and route information from edge server 101 and/or edge server controller 103. For instance, edge server 101 provides location and map services. Alternatively, such location and map services information may be cached locally in a persistent storage device of perception and planning system 301.

While autonomous vehicle 104 is moving along the route, perception and planning system 301 may also obtain real-time traffic information from edge server 101 and/or edge server controller 103, which obtained such information from a traffic information system or server (TIS). Based on the real-time traffic information, location information, as well as real-time local environment data detected or sensed by sensor system 305 (e.g., obstacles, objects, nearby vehicles), edge server 101, edge server controller 103 and/or perception and planning system 301 can plan an optimal route, where perception and planning system 301 drives autonomous vehicle 104, for example, via vehicle control system 302, according to the planned route to reach the specified destination safely and efficiently.

In one embodiment, perception and planning system 301 includes a memory 314 for storing a localization module 315, perception module 316, prediction module 317, decision module 318, planning module 319, control module 320, routing module 321, and controller interface module 322.

In one embodiment, such modules (modules 315-322) are installed in persistent storage device 323, loaded into memory 314, and executed by one or more processors (not shown). It is noted that some or all of these modules may be communicatively coupled to or integrated with some or all modules of vehicle control system 302 of FIG. 3. Some of modules 315-322 may be integrated together as an integrated module.

In one embodiment, localization module 315 determines a current location of autonomous vehicle 104 (e.g., leveraging GPS unit 307) and manages any data related to a trip or route of autonomous vehicle 104. Localization module 315 (also referred to as a map and route module) manages any data related to a trip or route of autonomous vehicle 104. Localization module 315 communicates with other components of autonomous vehicle 104, such as map and route information 324, to obtain the trip related data. For example, localization module 315 may obtain location and route information from edge server 101 and/or edge server controller 103. Edge server 101 and/or edge server controller 103 provides location and map services, which may be cached as part of map and route information 324. While autonomous vehicle 104 is moving along the route, localization module 315 may also obtain real-time traffic information from edge server 101 and/or edge server controller 103 and/or a traffic information system or server.

Based on the sensor data provided by sensor system 305 and localization information obtained by localization module 315, a perception of the surrounding environment is determined by perception module 316. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 316 may include a computer vision system or functionalities of a computer vision system to process and analyze images captured by one or more cameras in order to identify objects and/or features in the environment of autonomous vehicle 104. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 316 can also detect objects based on other data provided by other sensors, such as a radar and/or LiDAR.

For each of the objects, prediction module 317 predicts what the object will behave under the circumstances. The prediction is performed based on perception module 316 perceiving the driving environment at the point in time in view of a set of map and route information 324 and driving/traffic rules 325. For example, if the object is a vehicle at an opposing direction and the current driving environment includes an intersection, prediction module 317 will predict whether the vehicle will likely move straight forward or make a turn. If the perception data indicates that the intersection has no traffic light, prediction module 317 may predict that the vehicle may have to fully stop prior to entering the intersection. If the perception data indicates that the vehicle is currently at a left-turn only lane or a right-turn only lane, prediction module 317 may predict that the vehicle will more likely make a left turn or right turn, respectively.

For each of the objects, decision module 318 makes a decision regarding how to handle the object. For example, for a particular object (e.g., another vehicle in a crossing route) as well as its metadata describing the object (e.g., a speed, direction, turning angle), decision module 318 decides how to encounter the object (e.g., overtake, yield, stop, pass). Decision module 318 may make such decisions according to a set of rules, such as traffic rules or driving rules 325, which may be stored in persistent storage device 323.

In one embodiment, edge server 101 and/or edge server controller 103 and/or routing module 321 is configured to provide one or more routes or paths from a starting point to a destination point. In one embodiment, for a given trip from a start location to a destination location, for example, received from edge server 101 and/or edge server controller 103, routing module 321 obtains map and route information 324 and determines all possible routes or paths from the starting location to reach the destination location. Routing module 321 may generate a reference line in a form of a topographic map for each of the routes it determines from the starting location to reach the destination location. A reference line refers to an ideal route or path without any interference from others, such as other vehicles, obstacles, or traffic conditions. That is, if there is no other vehicle, pedestrians, or obstacles on the road, an autonomous vehicle should exactly or closely follow the reference line. The topographic maps are then provided to decision module 318 and/or planning module 319. Decision module 318 and/or planning module 319 examine all of the possible routes to select and modify one of the most optimal routes in view of other data provided by other modules, such as traffic conditions from localization module 315, driving environment perceived by perception module 316, and traffic conditions predicted by prediction module 317. The actual path or route for controlling autonomous vehicle 104 may be close to or different from the reference line provided by edge server 101 and/or edge server controller 103 and/or routing module 321 dependent upon the specific driving environment at the point in time.

Based on a decision for each of the objects perceived, planning module 319 plans a path or route for autonomous vehicle 104 as well as driving parameters (e.g., distance, speed, and/or turning angle) using a reference line provided by routing module 321 as a basis. Alternatively, such a path or route for autonomous vehicle 104 as well as driving parameters (e.g., distance, speed, and/or turning angle) are received from edge server 101 and/or edge server controller 103.

In one embodiment, for a given object, decision module 318 decides what to do with the object, while planning module 319 determines how to do it. For example, for a given object, decision module 318 may decide to pass the object, while planning module 319 may determine whether to pass on the left side or right side of the object. Planning and control data is generated by planning module 319 including information describing how autonomous vehicle 104 would move in a next moving cycle (e.g., next route/path segment). For example, the planning and control data may instruct autonomous vehicle 104 to move 10 meters at a speed of 30 miles per hour (mph), then change to a right lane at the speed of 25 mph.

Based on the planning and control data, control module 320 controls and drives autonomous vehicle 104, by sending proper commands or signals to vehicle control system 302, according to a route or path defined by the planning and control data. The planning and control data includes sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 319 plans a next route segment or path segment, for example, including a target position and the time required for autonomous vehicle 104 to reach the target position. Alternatively, planning module 319 may further specify the specific speed, direction, and/or steering angle, etc. In one embodiment, planning module 319 plans a route segment or path segment for the next predetermined period of time, such as 5 seconds. For each planning cycle, planning module 319 plans a target position for the current cycle (e.g., next 5 seconds) based on a target position planned in a previous cycle. Control module 320 then generates one or more control commands (e.g., throttle, brake, steering control commands) based on the planning and control data of the current cycle.

It is noted that decision module 318 and planning module 319 may be integrated as an integrated module. Decision module 318/planning module 319 may include a navigation system or functionalities of a navigation system to determine a driving path for autonomous vehicle 104. For example, the navigation system may determine a series of speeds and directional headings to affect movement of autonomous vehicle 104 along a path that substantially avoids perceived obstacles while generally advancing autonomous vehicle 104 along a roadway-based path leading to an ultimate destination. The destination may be set according to inputs from edge server 101 and/or edge server controller 103. The navigation system may update the driving path dynamically while autonomous vehicle 104 is in operation. The navigation system can incorporate data from a GPS system and one or more maps so as to determine the driving path for autonomous vehicle 104.

In one embodiment, controller interface module 322 is configured to communicate with edge server 101 and/or edge server controller 103, and receive control commands from edge server 101 and/or edge server controller 103. When edge server 101 and/or edge server controller 103 issues commands to autonomous vehicle 104, the commands are forwarded to control module 320. Control module 320 may generate control signals to operate autonomous vehicle 104 in accordance with the commands received from edge server 101 and/or edge server controller 103.

As discussed above, a discussion regarding the internal components of edge server 101 and edge server controller 103 is provided below in connection with FIG. 4.

FIG. 4 illustrates the internal components of edge server 101, edge server controller 103 used for controlling autonomous vehicles (e.g., autonomous vehicles 104) based on the edge servers' resources in accordance with an embodiment of the present disclosure.

Referring to FIG. 4, in conjunction with FIGS. 1-3, edge server 101 includes a module, referred to herein as the "vehicle supporter" 401, which is configured to establish the edge server load (i.e., estimate the load for edge server 101).

As discussed above, a load, as used herein, refers to the amount of work edge server 101 is handling at a given time. In one embodiment, vehicle supporter 401 estimates the load of edge server 101 that edge server 101 will handle in the near future, such as in the next 5 minutes of time.

In one embodiment, vehicle supporter 401 obtains the current load being handled by edge server 101 from a component referred to herein as the "self monitor" 402. In one embodiment, self monitor 402 utilizes a resource monitor for monitoring the current load being handled by edge server 101. In one embodiment, self monitor 402 utilizes various software tools for monitoring the current load being handled by edge server 101, including, but are not limited to, Sematext Monitoring, SolarWinds® Server & Application Manager, Dynatrace®, Datadog®, ManageEngine® OpManager, etc.

In one embodiment, vehicle supporter 401 obtains the load of neighboring edge servers 101 from edge monitoring 403 in edge server controller 103. A "neighboring edge server," as used herein, refers to an edge server (e.g., edge server 101B) located within a close proximity to the edge server in question (e.g., edge server 101A), such as an edge server 101 with a coverage area (e.g., coverage area 201B) that is adjacent to the coverage area (e.g., coverage area 201A) of the edge server in question.

In one embodiment, edge monitoring 403 utilizes a resource monitor for monitoring the current load being handled by the neighboring edge servers 101. In one embodiment, edge monitoring 403 utilizes various software tools for monitoring the current load being handled by the neighboring edge servers 101, including, but are not limited to, Sematext Monitoring, SolarWinds® Server & Application Manager, Dynatrace®, Datadog®, ManageEngine® OpManager, etc.

In one embodiment, edge monitoring 403 obtains the current load being handled by the neighboring edge servers 101 from the neighboring edge servers 101 themselves, such as via self monitor 402 of the neighboring edge servers 101.

In one embodiment, vehicle supporter 401 obtains the number of incoming/outgoing autonomous vehicles 104 in the coverage area (e.g., coverage area 201) of edge server 101 from vehicle manager 404 of edge server controller 103. In one embodiment, vehicle manager 404 is configured to manage the routes traveled by autonomous vehicles 104, including destinations. By managing the routes traveled by autonomous vehicles 104, vehicle manager 404 obtains the number of autonomous vehicles 104 entering and leaving coverage area 201 of edge server 101.

In one embodiment, vehicle manager 404 manages the routes traveled by autonomous vehicles 104 using various software tools, including, but are not limited to, Drive AV, OnFleet®, IntelliShift, etc.

Furthermore, in one embodiment, vehicle supporter 401 receives context information from environment collaborator 405 of edge server 101. Such context information includes information that a human driver usually takes into account while driving and adapting his/her driving, such as weather, road conditions, other vehicles, pedestrians, street signs, etc. In one embodiment, such context information may be, at least in part, in the form of video information obtained from cameras (e.g., cameras 306) of autonomous vehicles 104.

In one embodiment, vehicle supporter 401 estimates the load of edge server 101 that edge server 101 will handle in the near future, such as in the next 5 minutes of time based on the current edge server load, the estimated load of the neighboring edge servers 101, the number of incoming/outgoing autonomous vehicles 104 in coverage area 201 of edge server 101, and context information.

For example, in order to determine an appropriate estimate of the edge server load, the number of autonomous vehicles 104 residing within coverage area 201 of edge server 101 at the time of computing the edge server load needs to be obtained. Such information may be obtained based on the number of number of incoming/outgoing autonomous vehicles 104 in coverage area 201 of edge server 101.

In another example, in order to determine an appropriate estimate of the edge server load that edge server 101 will handle in the near future, an estimate of the amount of server load that is currently being handled by a neighboring edge server 101 that will have to be handled by edge server 101 in question in the near future as an autonomous vehicle 104 travels from the coverage area (e.g., coverage area 201B) of the neighboring edge server 101 to the coverage area (e.g., coverage area 201A) of edge server 101 in question needs to be identified. Such information may be obtained based on the number of incoming/outgoing autonomous vehicles 104 as well as the estimated load of the neighboring edge servers 101, including the estimated load for handling transactions involving such autonomous vehicles 104 traveling from the coverage area (e.g., coverage area 201B) of the neighboring edge server 101 to the coverage area (e.g., coverage area 201A) of edge server 101 in question.

Furthermore, in order to determine an appropriate estimate of the edge server load that edge server 101 will handle in the near future, an estimate of the amount of server load that is currently being handled by edge server 101 but will no longer have to be handled by edge server 101 since an autonomous vehicle 104 travels from the coverage area (e.g., coverage area 201A) of edge server 101 to the coverage area (e.g., coverage area 201B) of a neighboring edge server 101 needs to be identified. Such information may be obtained based on the number of incoming/outgoing autonomous vehicles 104 as well as the estimated load of edge server 101, including the estimated load for handling transactions involving such autonomous vehicles 104 traveling from the coverage area (e.g. coverage area 201A) of edge server 101 to the coverage area (e.g., coverage area 201B) of a neighboring edge server 101.

In a further example, in order to determine an appropriate estimate of the edge server load that edge server 101 will handle in the near future, context information may be utilized to determine how many transactions will potentially need to be handled by edge server 101. For example, if road conditions are poor, such as from rainy weather, then it may be inferred that edge server 101 will have to handle or process a greater number of transactions than normal. In another example, if an autonomous vehicle 104 is traveling in a congested area (e.g., traffic jam), then it may be inferred that edge server 101 will have to handle or process a greater number of transactions than normal.

In one embodiment, vehicle supporter 401 estimates the load of edge server 101 that edge server 101 will handle in the near future, such as in the next 5 minutes of time based on the information discussed above (e.g., the current edge server load, the estimated load of the neighboring edge servers 101, the number of incoming/outgoing autonomous vehicles 104 in coverage area 201 of edge server 101, and context information) using various software tools, including, but are not limited to, Sematext Monitoring, SolarWinds® Server & Application Manager, Dynatrace®, Datadog®, ManageEngine® OpManager, etc.

In one embodiment, vehicle supporter 401 determines if the estimated load of edge server 101 (e.g., edge server 101A) exceeds a threshold value, which may be user-designated.

If the estimated load of edge server 101 (e.g., edge server 101A) exceeds the threshold value, then self configurator 406 of vehicle supporter 401 determines if there is a load reduction plan to be applied to any autonomous vehicle 104 under the control of edge server 101 (i.e., any autonomous vehicle 104 residing within coverage area 201 of edge server 101).

For example, in one embodiment, autonomous vehicles 104 may be associated with a load reduction plan. A "load reduction plan," as used herein, refers to a strategy for reducing the load of edge server 101 (e.g., edge server 101A) by controlling autonomous vehicle 104 (e.g., autonomous vehicle 104A) in a certain manner, such as modifying the route of autonomous vehicle 104, modifying a movement of autonomous vehicle 104, modifying a frequency of sending vehicle data, offloading calculations to be performed in autonomous vehicle 104 that were previously being performed in edge server 101, joining autonomous vehicle 104 to a fleet of other autonomous vehicles 104, etc.

For example, the load reduction plan may instruct autonomous vehicle 104 to reduce its frequency of sending data obtained from sensor system 305.

In another example, the load reduction plan may involve creating a fleet group (a group of autonomous vehicles 104 engaged in the same activity) so as to reduce the number of sensor data that needs to be sent and received by edge server 101. For instance, such a fleet group may corresponds to autonomous vehicles 104 with a similar route plan.

In another example, the load reduction plan may include a policy to navigate autonomous vehicles 104 to other areas of less traffic where less transactions need to be handled and processed by edge server 101.

In a further example, the load reduction plan may involve reducing the amount of information that needs to be processed by edge server 101 by reducing the required resolution of the images being sent from autonomous vehicle 104 (e.g., images captured by cameras 306) to edge server 101.

Furthermore, another example of a load reduction plan involves having multiple autonomous vehicles 104, such as drones, flying in a formation thereby reducing the workload (amount of processing) on edge server 101 since location information, etc. of particular autonomous vehicles 104 can be discovered from the location information, etc. of other autonomous vehicles 104 that are all flying in the same formation.

In one embodiment, such load reduction plans may be stored in a data structure (e.g., table) of edge server 101, which may reside within a storage device of edge server 101. In one embodiment, such a data structure includes a listing of load reduction plans as well as the associated autonomous vehicles 104 to which such load reduction plans should be applied. For example, a particular load reduction plan may be applied to multiple autonomous vehicles 104 (e.g., autonomous vehicles 104A, 104B). Upon identifying autonomous vehicles 104 that are within the coverage area 201 of edge server 101, self configurator 406 performs a search in the data structure for matching autonomous vehicles 104, such as by an identifier associated with such autonomous vehicles 104, and then identify the corresponding load reduction plans to be implemented for such autonomous vehicles 104. In one embodiment, such a data structure is populated by an expert.

Furthermore, as illustrated in FIG. 4, vehicle supporter 401 includes load balancing collaborator 407, which is configured to determine if any of the neighboring edge servers 101 have capacity for handling an additional workload.

If any of the neighboring edge servers 101 (e.g., edge server 101B) has capacity for handling an additional workload, then load balancing collaborator 407 requests edge load balancer 408 of edge server controller 103 to instruct one or more autonomous vehicles 104 under the current control of edge server 101 (e.g., edge server 101A), and possibly also under the current control of the neighboring edge server 101 (e.g., edge server 101B), to reroute to the coverage area 201 (e.g., coverage area 201B) under the control of the neighboring edge server 101 (e.g., edge server 101B) so that the neighboring edge server 101 takes greater or full control of autonomous vehicle 104 thereby lessening the load of edge server 101 (e.g., edge server 101A).

For example, as shown in FIG. 2, load balancing collaborator 407 requests edge load balancer 408 of edge server controller 103 to instruct autonomous vehicle 104' to be rerouted from the coverage area 201 (e.g., coverage area 201B) under the control of edge server 101B to the coverage area 201 (e.g., coverage area 201A) under the control of a neighboring edge server 101, such as edge server 101A, in order to lessen the load of edge server 101B.

Furthermore, in one embodiment, vehicle supporter 401 is configured to restrict or prohibit driving of one or more autonomous vehicles 104, such as those located in coverage area 201 (e.g., coverage area 201A) under the control of edge server 101 (e.g., edge server 101A), in a manner that reduces the load of edge server 101 (e.g., edge server 101A). For example, vehicle supporter 401 may forbid autonomous vehicle 104 under the control of edge server 101 from making lane changes. When autonomous vehicle 104 is prevented from making lane changes, driving behavior analysis is reduced. In another example, vehicle supporter 401 prevents autonomous vehicle 104 under the control of edge server 101 from entering in an area edge server 101 covers, such as an area (e.g., congested area) that may lead to a greater load (e.g., greater number of transactions) on edge server 101.

In one embodiment, such restricted or prohibited driving is dynamically reflected on a map as illustrated in FIG. 2. For example, map 200 includes sign 202 (sign that indicates to not enter) that indicates that autonomous vehicle 104 is not to enter such an area. In another example, map 200 includes sign 203 (sign that indicates to not make lane changes) that indicates that autonomous vehicles 104 in such an area are not to make lane changes.

Additionally, as illustrated in FIG. 4, edge server controller 103 stores location data, such as the locations of edge servers 101 and autonomous vehicles 104, in database 409.

In this manner, transactions, such as transactions involving autonomous vehicles, can be handled at peak times with the limited computational resources of the edge servers by controlling autonomous vehicles based on the edge servers' resources.

A further description of these and other features is provided below in connection with the discussion of the method for handling transactions at peak times with the limited resources of the edge servers by controlling autonomous vehicles based on the edge servers' resources.

Prior to the discussion of the method for handling transactions at peak times with the limited resources of the edge servers by controlling autonomous vehicles based on the edge servers' resources, a description of the hardware configuration of edge server 101 (FIGS. 1, 4) and edge server controller 103 (FIGS. 1, 4) is provided below in connection with FIG. 5.

Referring now to FIG. 5, in conjunction with FIG. 1, FIG. 5 illustrates an embodiment of the present disclosure of the hardware configuration of edge server 101 and edge server controller 103 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 500 contains an example of an environment for the execution of at least some of the computer code (stored in block 501) involved in performing the disclosed methods, such as handling transactions at peak times with the limited resources of the edge servers by controlling autonomous vehicles based on the edge servers' resources. In addition to block 501, computing environment 500 includes, for example, edge server 101, edge server controller 103, wide area network (WAN) 524 (in one embodiment, WAN 524 corresponds to network 102 of FIG. 1), end user device (EUD) 502, remote server 503, public cloud 504, and private cloud 505. In this embodiment, edge server 101, edge server controller 103 includes processor set 506 (including processing circuitry 507 and cache 508), communication fabric 509, volatile memory 510, persistent storage 511 (including operating system 512 and block 501, as identified above), peripheral device set 513 (including user interface (UI) device set 514, storage 515, and Internet of Things (IoT) sensor set 516), and network module 517. Remote server 503 includes remote database 518. Public cloud 504 includes gateway 519, cloud orchestration module 520, host physical machine set 521, virtual machine set 522, and container set 523.

Edge server 101, edge server controller 103 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 518. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically edge server 101, edge server controller 103, to keep the presentation as simple as possible. Edge server 101, edge server controller 103 may be located in a cloud, even though it is not shown in a cloud in FIG. 5. On the other hand, edge server 101, edge server controller 103 is not required to be in a cloud except to any extent as may be affirmatively indicated.

Processor set 506 includes one, or more, computer processors of any type now known or to be developed in the future. Processing circuitry 507 may be distributed over multiple packages, for example, multiple, coordinated integrated circuit chips. Processing circuitry 507 may implement multiple processor threads and/or multiple processor cores. Cache 508 is memory that is located in the processor chip package(s) and is typically used for data or code that should be available for rapid access by the threads or cores running on processor set 506. Cache memories are typically organized into multiple levels depending upon relative proximity to the processing circuitry. Alternatively, some, or all, of the cache for the processor set may be located "off chip." In some computing environments, processor set 506 may be designed for working with qubits and performing quantum computing.

Computer readable program instructions are typically loaded onto edge server 101, edge server controller 103 to cause a series of operational steps to be performed by processor set 506 of edge server 101, edge server controller 103 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 508 and the other storage media discussed below. The program instructions, and associated data, are accessed by processor set 506 to control and direct performance of the disclosed methods. In computing environment 500, at least some of the instructions for performing the disclosed methods may be stored in block 501 in persistent storage 511.

Communication fabric 509 is the signal conduction paths that allow the various components of edge server 101, edge server controller 103 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 510 is any type of volatile memory now known or to be developed in the future. Examples include dynamic type random access memory (RAM) or static type RAM. Typically, the volatile memory is characterized by random access, but this is not required unless affirmatively indicated. In edge server 101, edge server controller 103, the volatile memory 510 is located in a single package and is internal to edge server 101, edge server controller 103, but, alternatively or additionally, the volatile memory may be distributed over multiple packages and/or located externally with respect to edge server 101, edge server controller 103.

Persistent Storage 511 is any form of non-volatile storage for computers that is now known or to be developed in the future. The non-volatility of this storage means that the stored data is maintained regardless of whether power is being supplied to edge server 101, edge server controller 103 and/or directly to persistent storage 511. Persistent storage 511 may be a read only memory (ROM), but typically at least a portion of the persistent storage allows writing of data, deletion of data and re-writing of data. Some familiar forms of persistent storage include magnetic disks and solid-state storage devices. Operating system 512 may take several forms, such as various known proprietary operating systems or open-source Portable Operating System Interface type operating systems that employ a kernel. The code included in block 501 typically includes at least some of the computer code involved in performing the disclosed methods.

Peripheral device set 513 includes the set of peripheral devices of edge server 101, edge server controller 103. Data communication connections between the peripheral devices and the other components of edge server 101, edge server controller 103 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 514 may include components such as a display screen, speaker, microphone, wearable devices (such as goggles and smart watches), keyboard, mouse, printer, touchpad, game controllers, and haptic devices. Storage 515 is external storage, such as an external hard drive, or insertable storage, such as an SD card. Storage 515 may be persistent and/or volatile. In some embodiments, storage 515 may take the form of a quantum computing storage device for storing data in the form of qubits. In embodiments where edge server 101, edge server controller 103 is required to have a large amount of storage (for example, where edge server 101, edge server controller 103 locally stores and manages a large database) then this storage may be provided by peripheral storage devices designed for storing very large amounts of data, such as a storage area network (SAN) that is shared by multiple, geographically distributed computers. IoT sensor set 516 is made up of sensors that can be used in Internet of Things applications. For example, one sensor may be a thermometer and another sensor may be a motion detector.

Network module 517 is the collection of computer software, hardware, and firmware that allows edge server 101, edge server controller 103 to communicate with other computers through WAN 524. Network module 517 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 517 are performed on the same physical hardware device. In other embodiments (for example, embodiments that utilize software-defined networking (SDN)), the control functions and the forwarding functions of network module 517 are performed on physically separate devices, such that the control functions manage several different network hardware devices. Computer readable program instructions for performing the disclosed methods can typically be downloaded to edge server 101, edge server controller 103 from an external computer or external storage device through a network adapter card or network interface included in network module 517.

WAN 524 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 502 is any computer system that is used and controlled by an end user (for example, a customer of an enterprise that operates edge server 101, edge server controller 103), and may take any of the forms discussed above in connection with edge server 101, edge server controller 103. EUD 502 typically receives helpful and useful data from the operations of edge server 101, edge server controller 103. For example, in a hypothetical case where edge server 101, edge server controller 103 is designed to provide a recommendation to an end user, this recommendation would typically be communicated from network module 517 of edge server 101, edge server controller 103 through WAN 524 to EUD 502. In this way, EUD 502 can display, or otherwise present, the recommendation to an end user. In some embodiments, EUD 502 may be a client device, such as thin client, heavy client, mainframe computer, desktop computer and so on.

Remote server 503 is any computer system that serves at least some data and/or functionality to edge server 101, edge server controller 103. Remote server 503 may be controlled and used by the same entity that operates edge server 101, edge server controller 103. Remote server 503 represents the machine(s) that collect and store helpful and useful data for use by other computers, such as edge server 101, edge server controller 103. For example, in a hypothetical case where edge server 101, edge server controller 103 is designed and programmed to provide a recommendation based on historical data, then this historical data may be provided to edge server 101, edge server controller 103 from remote database 518 of remote server 503.

Public cloud 504 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 504 is performed by the computer hardware and/or software of cloud orchestration module 520. The computing resources provided by public cloud 504 are typically implemented by virtual computing environments that run on various computers making up the computers of host physical machine set 521, which is the universe of physical computers in and/or available to public cloud 504. The virtual computing environments (VCEs) typically take the form of virtual machines from virtual machine set 522 and/or containers from container set 523. It is understood that these VCEs may be stored as images and may be transferred among and between the various physical machine hosts, either as images or after instantiation of the VCE. Cloud orchestration module 520 manages the transfer and storage of images, deploys new instantiations of VCEs and manages active instantiations of VCE deployments. Gateway 519 is the collection of computer software, hardware, and firmware that allows public cloud 504 to communicate through WAN 524.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 505 is similar to public cloud 504, except that the computing resources are only available for use by a single enterprise. While private cloud 505 is depicted as being in communication with WAN 524 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 504 and private cloud 505 are both part of a larger hybrid cloud.

Block 501 further includes the software components discussed above in connection with FIGS. 2-4 to handle transactions at peak times with the limited resources of the edge servers by controlling autonomous vehicles based on the edge servers' resources. In one embodiment, such components may be implemented in hardware. The functions discussed above performed by such components are not generic computer functions. As a result, edge server 101, edge server controller 103 is a particular machine that is the result of implementing specific, non-generic computer functions.

In one embodiment, the functionality of such software components of edge server 101, edge server controller 103, including the functionality for handling transactions at peak times with the limited resources of the edge servers by controlling autonomous vehicles based on the edge servers' resources, may be embodied in an application specific integrated circuit.

As stated above, autonomous vehicles have the ability to continuously monitor their surroundings using an array of sensors, including cameras, radars, and lidars. These sensors provide a 360-degree view of the vehicle's environment, allowing it to detect any potential obstacles, pedestrians, or other vehicles with great precision. The advanced algorithms interpreting this data can make split-second decisions to avoid collisions and navigate safely through complex situations. Autonomous mobility involving the movement of such autonomous vehicles may be implemented using edge computing. Edge computing refers to the architecture of a distributed computing paradigm that brings computation and data storage closer to the sources of data. Edge computing may be implemented using edge servers, which correspond to servers that are located close to the end user at the edge of the network. Such edge servers may be utilized for handling various transactions, such as controlling autonomous vehicles in connection with handling traffic congestion, optimizing the routes of the autonomous vehicles, adjusting the speeds of the autonomous vehicles, merging autonomous vehicles efficiently, etc. Such controlling of autonomous vehicles requires extensive computational resources. As a result, at times, the load of the edge server (the amount of work the edge server is handling at a given time) may be extensive, including causing the edge server to experience a peak load (highest amount of work the edge server is capable of handling at a given time). The time at which the edge server experiences a peak load is referred to as the "peak time." In order to address such situations in which the edge server may be limited in handling transactions, such as during the peak times, transactions may be offloaded to adjacent edge servers or to cloud servers temporarily. However, the latency and accuracy of the computational analysis being performed by the edge servers is reduced. Another alternative to addressing the situation when the edge server experiences peak load during peak times is to deploy extra edge servers. Unfortunately, such a solution requires additional costs, which can be very extensive. Consequently, there is not currently a means for handling transactions, such as transactions involving autonomous vehicles, at peak times with the limited computational resources of the edge servers.

Figure 7:
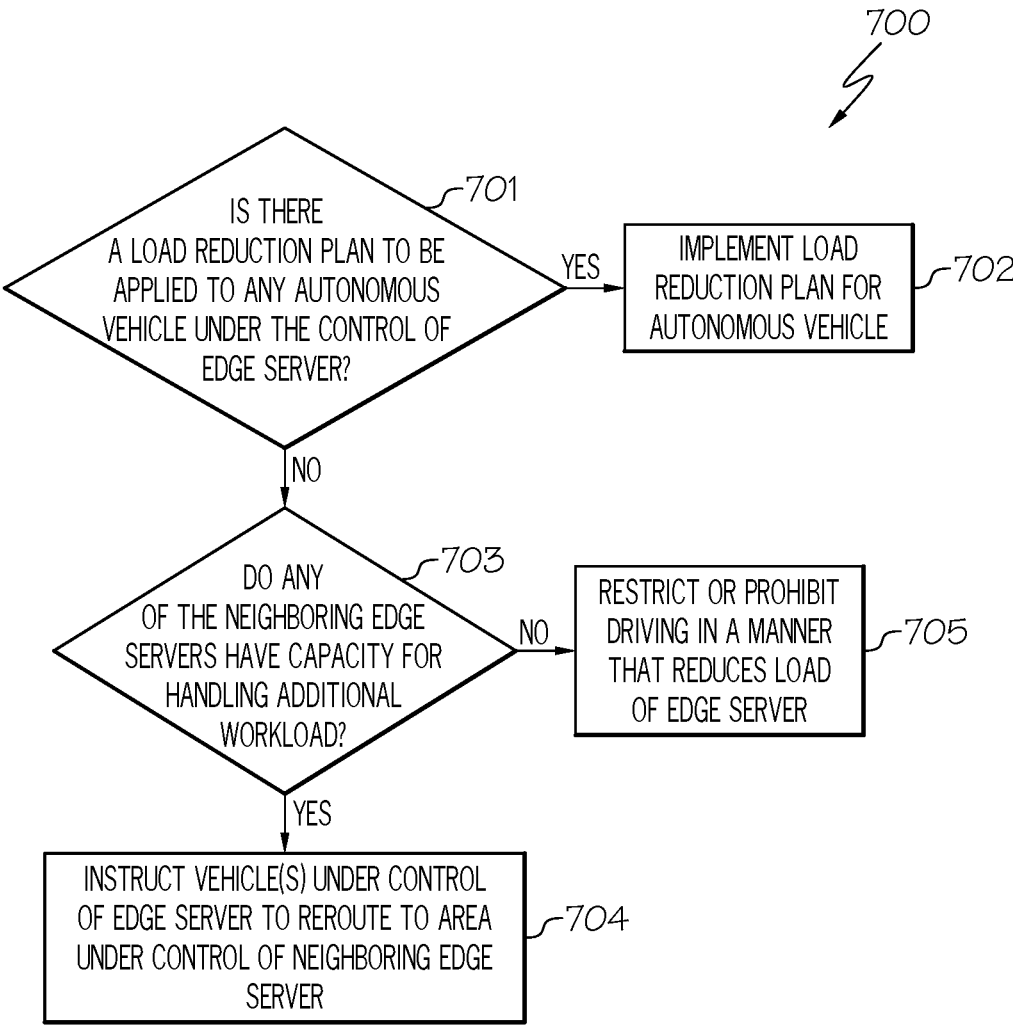
FIG. 7 is a flowchart of a method for implementing an action to reduce the load of the edge server by controlling autonomous vehicles to operate in a certain manner in accordance with an embodiment of the present disclosure.

The embodiments of the present disclosure provide a means for handling transactions at peak times with the limited computational resources of the edge servers by reducing the peak load of edge servers collaborating among multiple autonomous vehicles and multiple edge servers by controlling autonomous vehicles based on the edge servers' resources as discussed below in connection with FIGS. 6-7. FIG. 6 is a flowchart of a method for handling transactions at peak times with the limited resources of the edge servers by controlling autonomous vehicles based on the edge servers' resources. FIG. 7 is a flowchart of a method for implementing an action to reduce the load of the edge server by controlling autonomous vehicles to operate in a certain manner.

As stated above, FIG. 6 is a flowchart of a method 600 for handling transactions at peak times with the limited resources of the edge servers (e.g., edge servers 101) by controlling autonomous vehicles (e.g., autonomous vehicles 104) based on the edge servers' resources in accordance with an embodiment of the present disclosure.

Referring to FIG. 6, in conjunction with FIGS. 1-5, in operation 601, vehicle supporter 401 of edge server 101 estimates a load of edge server 101 (e.g., edge server 101A) controlling autonomous vehicles 104 that are located within edge server's coverage area 201 (e.g., coverage area 201A).

As discussed above, a load, as used herein, refers to the amount of work edge server 101 is handling at a given time. In one embodiment, vehicle supporter 401 estimates the load of edge server 101 that edge server 101 will handle in the near future, such as in the next 5 minutes of time.

In one embodiment, vehicle supporter 401 obtains the current load being handled by edge server 101 from a component referred to herein as the "self monitor" 402. In one embodiment, self monitor 402 utilizes a resource monitor for monitoring the current load being handled by edge server 101. In one embodiment, self monitor 402 utilizes various software tools for monitoring the current load being handled by edge server 101, including, but are not limited to, Sematext Monitoring, SolarWinds® Server & Application Manager, Dynatrace®, Datadog®, ManageEngine® OpManager, etc.

In one embodiment, vehicle supporter 401 obtains the load of neighboring edge servers 101 from edge monitoring 403 in edge server controller 103. A "neighboring edge server," as used herein, refers to an edge server (e.g., edge server 101B) located within a close proximity to the edge server in question (e.g., edge server 101A), such as an edge server 101 with a coverage area (e.g., coverage area 201B) that is adjacent to the coverage area (e.g., coverage area 201A) of the edge server in question.

In one embodiment, edge monitoring 403 utilizes a resource monitor for monitoring the current load being handled by the neighboring edge servers 101. In one embodiment, edge monitoring 403 utilizes various software tools for monitoring the current load being handled by the neighboring edge servers 101, including, but are not limited to, Sematext Monitoring, SolarWinds® Server & Application Manager, Dynatrace®, Datadog®, ManageEngine® OpManager, etc.

In one embodiment, edge monitoring 403 obtains the current load being handled by the neighboring edge servers 101 from the neighboring edge servers 101 themselves, such as via self monitor 402 of the neighboring edge servers 101.

In one embodiment, vehicle supporter 401 obtains the number of incoming/outgoing autonomous vehicles 104 in the coverage area (e.g., coverage area 201) of edge server 101 from vehicle manager 404 of edge server controller 103. In one embodiment, vehicle manager 404 is configured to manage the routes traveled by autonomous vehicles 104, including destinations. By managing the routes traveled by autonomous vehicles 104, vehicle manager 404 obtains the number of autonomous vehicles 104 entering and leaving coverage area 201 of edge server 101.

In one embodiment, vehicle manager 404 manages the routes traveled by autonomous vehicles 104 using various software tools, including, but are not limited to, Drive AV, OnFleet®, IntelliShift, etc.

Furthermore, in one embodiment, vehicle supporter 401 receives context information from environment collaborator 405 of edge server 101. Such context information includes information that a human driver usually takes into account while driving and adapting his/her driving, such as weather, road conditions, other vehicles, pedestrians, street signs, etc. In one embodiment, such context information may be, at least in part, in the form of video information obtained from cameras (e.g., cameras 306) of autonomous vehicles 104.

In one embodiment, vehicle supporter 401 estimates the load of edge server 101 that edge server 101 will handle in the near future, such as in the next 5 minutes of time based on the current edge server load, the estimated load of the neighboring edge servers 101, the number of incoming/outgoing autonomous vehicles 104 in coverage area 201 of edge server 101, and context information.

For example, in order to determine an appropriate estimate of the edge server load, the number of autonomous vehicles 104 residing within coverage area 201 of edge server 101 at the time of computing the edge server load needs to be obtained. Such information may be obtained based on the number of number of incoming/outgoing autonomous vehicles 104 in coverage area 201 of edge server 101.

In another example, in order to determine an appropriate estimate of the edge server load that edge server 101 will handle in the near future, an estimate of the amount of server load that is currently being handled by a neighboring edge server 101 that will have to be handled by edge server 101 in question in the near future as an autonomous vehicle 104 travels from the coverage area (e.g., coverage area 201B) of the neighboring edge server 101 to the coverage area (e.g., coverage area 201A) of edge server 101 in question needs to be identified. Such information may be obtained based on the number of incoming/outgoing autonomous vehicles 104 as well as the estimated load of the neighboring edge servers 101, including the estimated load for handling transactions involving such autonomous vehicles 104 traveling from the coverage area (e.g., coverage area 201B) of the neighboring edge server 101 to the coverage area (e.g., coverage area 201A) of edge server 101 in question.

Furthermore, in order to determine an appropriate estimate of the edge server load that edge server 101 will handle in the near future, an estimate of the amount of server load that is currently being handled by edge server 101 but will no longer have to be handled by edge server 101 since an autonomous vehicle 104 travels from the coverage area (e.g., coverage area 201A) of edge server 101 to the coverage area (e.g., coverage area 201B) of a neighboring edge server 101 needs to be identified. Such information may be obtained based on the number of incoming/outgoing autonomous vehicles 104 as well as the estimated load of edge server 101, including the estimated load for handling transactions involving such autonomous vehicles 104 traveling from the coverage area (e.g. coverage area 201A) of edge server 101 to the coverage area (e.g., coverage area 201B) of a neighboring edge server 101.

In a further example, in order to determine an appropriate estimate of the edge server load that edge server 101 will handle in the near future, context information may be utilized to determine how many transactions will potentially need to be handled by edge server 101. For example, if road conditions are poor, such as from rainy weather, then it may be inferred that edge server 101 will have to handle or process a greater number of transactions than normal. In another example, if an autonomous vehicle 104 is traveling in a congested area (e.g., traffic jam), then it may be inferred that edge server 101 will have to handle or process a greater number of transactions than normal.

In one embodiment, vehicle supporter 401 estimates the load of edge server 101 that edge server 101 will handle in the near future, such as in the next 5 minutes of time based on the information discussed above (e.g., the current edge server load, the estimated load of the neighboring edge servers 101, the number of incoming/outgoing autonomous vehicles 104 in coverage area 201 of edge server 101, and context information) using various software tools, including, but are not limited to, Sematext Monitoring, SolarWinds® Server & Application Manager, Dynatrace®, Datadog®, ManageEngine® OpManager, etc.

In operation 602, vehicle supporter 401 of edge server 101 determines if the estimated load of edge server 101 (e.g., edge server 101A) exceeds a threshold value, which may be user-designated.

If the estimated load of edge server 101 (e.g., edge server 101A) does not exceed the threshold value, then vehicle supporter 401 continues to estimate the load of edge server 101 (e.g., edge server 101A) in operation 601.

If, however, the estimated load of edge server 101 (e.g., edge server 101A) exceeds the threshold value, then, in operation 603, vehicle supporter 401 of edge server 101 implements an action to reduce the load (e.g., peak load) of edge server 101 (e.g., edge server 101A) by controlling autonomous vehicle(s) 104 to operate in a certain manner that enables the reduction of the load of edge server 101 (e.g., edge server 101A).

A further discussion regarding implementing such an action to reduce the load of edge server 101 is provided below in connection with FIG. 7.

FIG. 7 is a flowchart of a method 700 for implementing an action to reduce the load of the edge server by controlling autonomous vehicles to operate in a certain manner in accordance with an embodiment of the present disclosure.

Referring to FIG. 7, in conjunction with FIGS. 1-6, in operation 701, self configurator 406 of vehicle supporter 401 determines if there is a load reduction plan to be applied to any autonomous vehicle 104 under the control of edge server 101 (i.e., any autonomous vehicle 104 residing within coverage area 201 of edge server 101).

As stated above, for example, in one embodiment, autonomous vehicles 104 may be associated with a load reduction plan. A "load reduction plan," as used herein, refers to a strategy for reducing the load of edge server 101 (e.g., edge server 101A) by controlling autonomous vehicle 104 (e.g., autonomous vehicle 104A) in a certain manner, such as modifying the route of autonomous vehicle 104, modifying a movement of autonomous vehicle 104, modifying a frequency of sending vehicle data, offloading calculations to be performed in autonomous vehicle 104 that were previously being performed in edge server 101, joining autonomous vehicle 104 to a fleet of other autonomous vehicles 104, etc.

In one embodiment, such load reduction plans may be stored in a data structure (e.g., table) of edge server 101, which may reside within a storage device (e.g., storage device 511, 515) of edge server 101. In one embodiment, such a data structure includes a listing of load reduction plans as well as the associated autonomous vehicles 104 to which such load reduction plans should be applied. For example, a particular load reduction plan may be applied to multiple autonomous vehicles 104 (e.g., autonomous vehicles 104A, 104B). Upon identifying autonomous vehicles 104 that are within the coverage area 201 of edge server 101, self configurator 406 performs a search in the data structure for matching autonomous vehicles 104, such as by an identifier associated with such autonomous vehicles 104, and then identify the corresponding load reduction plans to be implemented for such autonomous vehicles 104. In one embodiment, such a data structure is populated by an expert.

If there is a load reduction plan to be applied to an autonomous vehicle(s) 104 under the control of edge server 101, then, in operation 702, self configurator 406 of vehicle supporter 401 implements the load reduction plan for the associated autonomous vehicle(s) 104.

As discussed above, the load reduction plan may instruct autonomous vehicle 104 to reduce its frequency of sending data obtained from sensor system 305.

In another example, the load reduction plan may involve creating a fleet group (a group of autonomous vehicles 104 engaged in the same activity) so as to reduce the number of sensor data that needs to be sent and received by edge server 101. For instance, such a fleet group may corresponds to autonomous vehicles 104 with a similar route plan.

In another example, the load reduction plan may include a policy to navigate autonomous vehicles 104 to other areas of less traffic where less transactions need to be handled and processed by edge server 101.

In a further example, the load reduction plan may involve reducing the amount of information that needs to be processed by edge server 101 by reducing the required resolution of the images being sent from autonomous vehicle 104 (e.g., images captured by cameras 306) to edge server 101.

Furthermore, another example of a load reduction plan involves having multiple autonomous vehicles 104, such as drones, flying in a formation thereby reducing the workload (amount of processing) on edge server 101 since location information, etc. of particular autonomous vehicles 104 can be discovered from the location information, etc. of other autonomous vehicles 104 that are all flying in the same formation.

If, however, there is not a load reduction plan to be applied to an autonomous vehicle(s) 104 under the control of edge server 101, then, in operation 703, load balancing collaborator 407 of vehicle supporter 401 determines if any of the neighboring edge servers 101 have capacity for handling an additional workload.

If any of the neighboring edge servers 101 (e.g., edge server 101B) has capacity for handling an additional workload, then, in operation 704, load balancing collaborator 407 of vehicle supporter 401 requests edge load balancer 408 of edge server controller 103 to instruct one or more autonomous vehicles 104 under the current control of edge server 101 (e.g., edge server 101A), and possibly also under the current control of the neighboring edge server 101 (e.g., edge server 101B), to reroute to the coverage area 201 (e.g., coverage area 201B) under the control of the neighboring edge server 101 (e.g., edge server 101B) so that the neighboring edge server 101 takes greater or full control of autonomous vehicle 104 thereby lessening the load of edge server 101 (e.g., edge server 101A).

For example, as shown in FIG. 2, load balancing collaborator 407 requests edge load balancer 408 of edge server controller 103 to instruct autonomous vehicle 104' to be rerouted from the coverage area 201 (e.g., coverage area 201B) under the control of edge server 101B to the coverage area 201 (e.g., coverage area 201A) under the control of a neighboring edge server 101, such as edge server 101A, in order to lessen the load of edge server 101B.

If none of the neighboring edge servers 101 (e.g., edge server 101B) have capacity for handling an additional workload, then, in operation 705, vehicle supporter 401 of edge server 101 restricts or prohibits driving of one or more autonomous vehicles 104, such as those located in coverage area 201 (e.g., coverage area 201A) under the control of edge server 101 (e.g., edge server 101A), in a manner that reduces the load of edge server 101 (e.g., edge server 101A).

As stated above, for example, vehicle supporter 401 may forbid autonomous vehicle 104 under the control of edge server 101 from making lane changes. When autonomous vehicle 104 is prevented from making lane changes, driving behavior analysis is reduced. In another example, vehicle supporter 401 prevents autonomous vehicle 104 under the control of edge server 101 from entering in an area edge server 101 covers, such as an area (e.g., congested area) that may lead to a greater load (e.g., greater number of transactions) on edge server 101.

In one embodiment, such restricted or prohibited driving is dynamically reflected on a map as illustrated in FIG. 2. For example, map 200 includes sign 202 (sign that indicates to not enter) that indicates that autonomous vehicle 104 is not to enter such an area. In another example, map 200 includes sign 203 (sign that indicates to not make lane changes) that indicates that autonomous vehicles 104 in such an area are not to make lane changes.

In this manner, transactions, such as transactions involving autonomous vehicles, can be handled at peak times with the limited computational resources of the edge servers by controlling autonomous vehicles based on the edge servers' resources.

As a result of the foregoing, transactions at peak times can be handled with the limited computational resources of the edge servers in an autonomous mobility environment by reducing the peak load of edge servers collaborating among multiple autonomous vehicles and multiple edge servers by controlling autonomous vehicles based on the edge servers' resources.

Furthermore, the principles of the present disclosure improve the technology or technical field involving autonomous mobility.

As discussed above, autonomous vehicles have the ability to continuously monitor their surroundings using an array of sensors, including cameras, radars, and lidars. These sensors provide a 360-degree view of the vehicle's environment, allowing it to detect any potential obstacles, pedestrians, or other vehicles with great precision. The advanced algorithms interpreting this data can make split-second decisions to avoid collisions and navigate safely through complex situations. Autonomous mobility involving the movement of such autonomous vehicles may be implemented using edge computing. Edge computing refers to the architecture of a distributed computing paradigm that brings computation and data storage closer to the sources of data. Edge computing may be implemented using edge servers, which correspond to servers that are located close to the end user at the edge of the network. Such edge servers may be utilized for handling various transactions, such as controlling autonomous vehicles in connection with handling traffic congestion, optimizing the routes of the autonomous vehicles, adjusting the speeds of the autonomous vehicles, merging autonomous vehicles efficiently, etc. Such controlling of autonomous vehicles requires extensive computational resources. As a result, at times, the load of the edge server (the amount of work the edge server is handling at a given time) may be extensive, including causing the edge server to experience a peak load (highest amount of work the edge server is capable of handling at a given time). The time at which the edge server experiences a peak load is referred to as the "peak time." In order to address such situations in which the edge server may be limited in handling transactions, such as during the peak times, transactions may be offloaded to adjacent edge servers or to cloud servers temporarily. However, the latency and accuracy of the computational analysis being performed by the edge servers is reduced. Another alternative to addressing the situation when the edge server experiences peak load during peak times is to deploy extra edge servers. Unfortunately, such a solution requires additional costs, which can be very extensive. Consequently, there is not currently a means for handling transactions, such as transactions involving autonomous vehicles, at peak times with the limited computational resources of the edge servers.

Embodiments of the present disclosure improve such technology by estimating the load of an edge server, which controls autonomous vehicles located within the edge server's coverage area. In one embodiment, the estimated load of the edge server corresponds to an estimated load that the edge server will handle in the near future. In one embodiment, the estimated load is based on the current edge server load, the estimated load of the neighboring edge servers, the number of incoming/outgoing autonomous vehicles in the coverage area of the edge server, and context information (information that a human driver usually takes into account while driving and adapting his/her driving, such as weather, road conditions, other vehicles, pedestrians, street signs, etc.). In response to the estimated load of the edge server exceeding a threshold value, an action to reduce the load of the edge server is implemented by controlling one or more of the autonomous vehicles to operate in a certain manner so as to reduce the load of the edge server. Examples of controlling the autonomous vehicles to operate in a certain manner so as to reduce the load of the edge server include modifying a movement of the autonomous vehicle, modifying a frequency of sending vehicle data, offloading calculations to be performed in the autonomous vehicle that were previously being performed in the edge server, joining the autonomous vehicle in a fleet of other autonomous vehicles, restricting lane changes, rerouting an autonomous vehicle to an area under control of a neighboring edge server so that the edge server with the peak load is not to be used, etc. In this manner, the peak load of edge servers collaborating among multiple autonomous vehicles and multiple edge servers is reduced by controlling autonomous vehicles based on the edge servers' resources. Furthermore, in this manner, there is an improvement in the technical field involving autonomous mobility.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for reducing loads of edge servers in an autonomous mobility environment, the method comprising:

estimating a load of an edge server controlling autonomous vehicles;

obtaining a load of neighboring edge servers;

determining if there is a load reduction plan to be applied to one or more of said autonomous vehicles in response to said estimated load of said edge server exceeding a threshold value; and instructing said one or more of said autonomous vehicles to reroute to a coverage area under a control of a neighboring edge server with capacity for handling an additional workload in response to not applying said load reduction plan.

2. The computer-implemented method as recited in claim 1 further comprising:

implementing said load reduction plan associated with said one or more of said autonomous vehicles in response to determining there is said load reduction plan to be applied to said one or more of said autonomous vehicles.

3. The computer-implemented method as recited in claim 2, wherein said load reduction plan comprises one or more of the following in the group consisting of: modifying a route of an autonomous vehicle, modifying a movement of said autonomous vehicle, modifying a frequency of sending vehicle data, offloading calculations to be performed in said autonomous vehicle that were previously being performed in said edge server, and joining said autonomous vehicle in a fleet of other autonomous vehicles.

4. The computer-implemented method as recited in claim 2, wherein said load reduction plan comprises one or more of the following in the group consisting of: modifying a frequency of sending vehicle data, offloading calculations to be performed in an autonomous vehicle that were previously being performed in said edge server, and joining said autonomous vehicle in a fleet of other autonomous vehicles.

5. The computer-implemented method as recited in claim 1 further comprising:

restricting or prohibiting driving of an autonomous vehicle in a manner that reduces said load of said edge server in response to said estimated load of said edge server exceeding said threshold value.

6. The computer-implemented method as recited in claim 5, wherein said restricted or prohibited driving comprises forbidding lane changes and preventing said autonomous vehicle from entering in an area said edge server covers.

7. The computer-implemented method as recited in claim 6, wherein said restricted or prohibited driving is dynamically reflected on a map.

8. A computer program product for reducing loads of edge servers in an autonomous mobility environment, the computer program product comprising one or more non-transitory computer readable storage mediums having program code embodied therewith, the program code comprising programming instructions for:

estimating a load of an edge server controlling autonomous vehicles;

obtaining a load of neighboring edge servers;

determining if there is a load reduction plan to be applied to one or more of said autonomous vehicles in response to said estimated load of said edge server exceeding a threshold value; and instructing said one or more of said autonomous vehicles to reroute to a coverage area under a control of a neighboring edge server with capacity for handling an additional workload in response to not applying said load reduction plan.

9. The computer program product as recited in claim 8, wherein the program code further comprises the programming instructions for:

implementing said load reduction plan associated with said one or more of said autonomous vehicles in response to determining there is said load reduction plan to be applied to said one or more of said autonomous vehicles.

10. The computer program product as recited in claim 9, wherein said load reduction plan comprises one or more of the following in the group consisting of: modifying a route of an autonomous vehicle, modifying a movement of said autonomous vehicle, modifying a frequency of sending vehicle data, offloading calculations to be performed in said autonomous vehicle that were previously being performed in said edge server, and joining said autonomous vehicle in a fleet of other autonomous vehicles.

11. The computer program product as recited in claim 9, wherein said load reduction plan comprises one or more of the following in the group consisting of: modifying a frequency of sending vehicle data, offloading calculations to be performed in an autonomous vehicle that were previously being performed in said edge server, and joining said autonomous vehicle in a fleet of other autonomous vehicles.

12. The computer program product as recited in claim 8, wherein the program code further comprises the programming instructions for:

restricting or prohibiting driving of an autonomous vehicle in a manner that reduces said load of said edge server in response to said estimated load of said edge server exceeding said threshold value.

13. The computer program product as recited in claim 12, wherein said restricted or prohibited driving comprises forbidding lane changes and preventing said autonomous vehicle from entering in an area said edge server covers.

14. The computer program product as recited in claim 13, wherein said restricted or prohibited driving is dynamically reflected on a map.

15. A system, comprising:

a memory for storing a computer program for reducing loads of edge servers in an autonomous mobility environment; and a processor connected to the memory, wherein the processor is configured to execute program instructions of the computer program comprising:

estimating a load of an edge server controlling autonomous vehicles;

obtaining a load of neighboring edge servers;

determining if there is a load reduction plan to be applied to one or more of said autonomous vehicles in response to said estimated load of said edge server exceeding a threshold value; and instructing said one or more of said autonomous vehicles to reroute to a coverage area under a control of a neighboring edge server with capacity for handling an additional workload in response to not applying said load reduction plan.

16. The system as recited in claim 15, wherein the program instructions of the computer program further comprise:

implementing said load reduction plan associated with said one or more of said autonomous vehicles in response to determining there is said load reduction plan to be applied to said one or more of said autonomous vehicles.

17. The system as recited in claim 16, wherein said load reduction plan comprises one or more of the following in the group consisting of: modifying a route of an autonomous vehicle, modifying a movement of said autonomous vehicle, modifying a frequency of sending vehicle data, offloading calculations to be performed in said autonomous vehicle that were previously being performed in said edge server, and joining said autonomous vehicle in a fleet of other autonomous vehicles.

18. The system as recited in claim 16, wherein said load reduction plan comprises one or more of the following in the group consisting of: modifying a frequency of sending vehicle data, offloading calculations to be performed in an autonomous vehicle that were previously being performed in said edge server, and joining said autonomous vehicle in a fleet of other autonomous vehicles.

19. The system as recited in claim 15, wherein the program instructions of the computer program further comprise:

restricting or prohibiting driving of an autonomous vehicle in a manner that reduces said load of said edge server in response to said estimated load of said edge server exceeding said threshold value.

20. The system as recited in claim 19, wherein said restricted or prohibited driving comprises forbidding lane changes and preventing said autonomous vehicle from entering in an area said edge server covers.

* * * * *